US008645021B2

(12) United States Patent
Gin

(10) Patent No.: US 8,645,021 B2
(45) Date of Patent: Feb. 4, 2014

(54) REMOTE TRACING OF SOFTWARE ON AN AVIONIC DEVICE

(75) Inventor: Gary Gin, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 182 days.

(21) Appl. No.: 13/239,703

(22) Filed: Sep. 22, 2011

(65) Prior Publication Data
US 2013/0080839 A1 Mar. 28, 2013

(51) Int. Cl.
G01M 17/00 (2006.01)

(52) U.S. Cl.
USPC ............................ 701/31.5; 342/36

(58) Field of Classification Search
USPC ............ 701/31.5, 3, 8, 31.4, 29.1, 2; 342/36, 342/37, 357.52
See application file for complete search history.

(56) References Cited

U.S. PATENT DOCUMENTS

2007/0244608 A1* 10/2007 Rath et al. ................ 701/3
2010/0262715 A1* 10/2010 Tamalet et al. ............ 709/238

OTHER PUBLICATIONS

S. Wilmot & McDade, "Product Specification for the 967-0212 Aircraft Condition Monitoring System (ACMS)—Common Functions", Dec. 2000, pp. 1-8.

* cited by examiner

Primary Examiner — Thomas Black
Assistant Examiner — Luke Huynh
(74) Attorney, Agent, or Firm — Fogg & Powers LLC

(57) ABSTRACT

In one embodiment, a method for remotely initiating a software trace on an avionics device operating on an aircraft is provided. The method includes at the avionics device, receiving one or more messages sent from a ground station over an aeronautical datalink to the aircraft, wherein the one or more messages conform to a protocol of the aeronautical datalink. The one or more messages are interpreted to identify any commands for the avionic device therein. If the one or more messages include one or more commands for tracing software on the avionic device, the software on the avionic device is traced in response to the one or more commands. Trace data obtained from tracing the software can be sent to a memory device for storage.

20 Claims, 2 Drawing Sheets

REMOTE TRACING OF SOFTWARE ON AN AVIONIC DEVICE

BACKGROUND

Many avionic devices have debug utilities built into the avionic devices. These debug utilities can include a trace functionality which enables tracing operation of the software on the avionic device. The debug utilities enable software traces to operate on the avionic device while the aircraft to which the avionic device corresponds is airborne. The data from the software trace can be stored in a memory device. Thus, when the aircraft returns to the ground, the data can be analyzed to debug the software on the avionic device.

SUMMARY

In one embodiment, a method for remotely initiating a software trace on an avionics device operating on an aircraft is provided. The method includes at the avionics device, receiving one or more messages sent from a ground station over an aeronautical datalink to the aircraft, wherein the one or more messages conform to a protocol of the aeronautical datalink. The one or more messages are interpreted to identify any commands for the avionic device therein. If the one or more messages include one or more commands for tracing software on the avionic device, the software on the avionic device is traced in response to the one or more commands. Trace data obtained from tracing the software can be sent to a memory device for storage.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
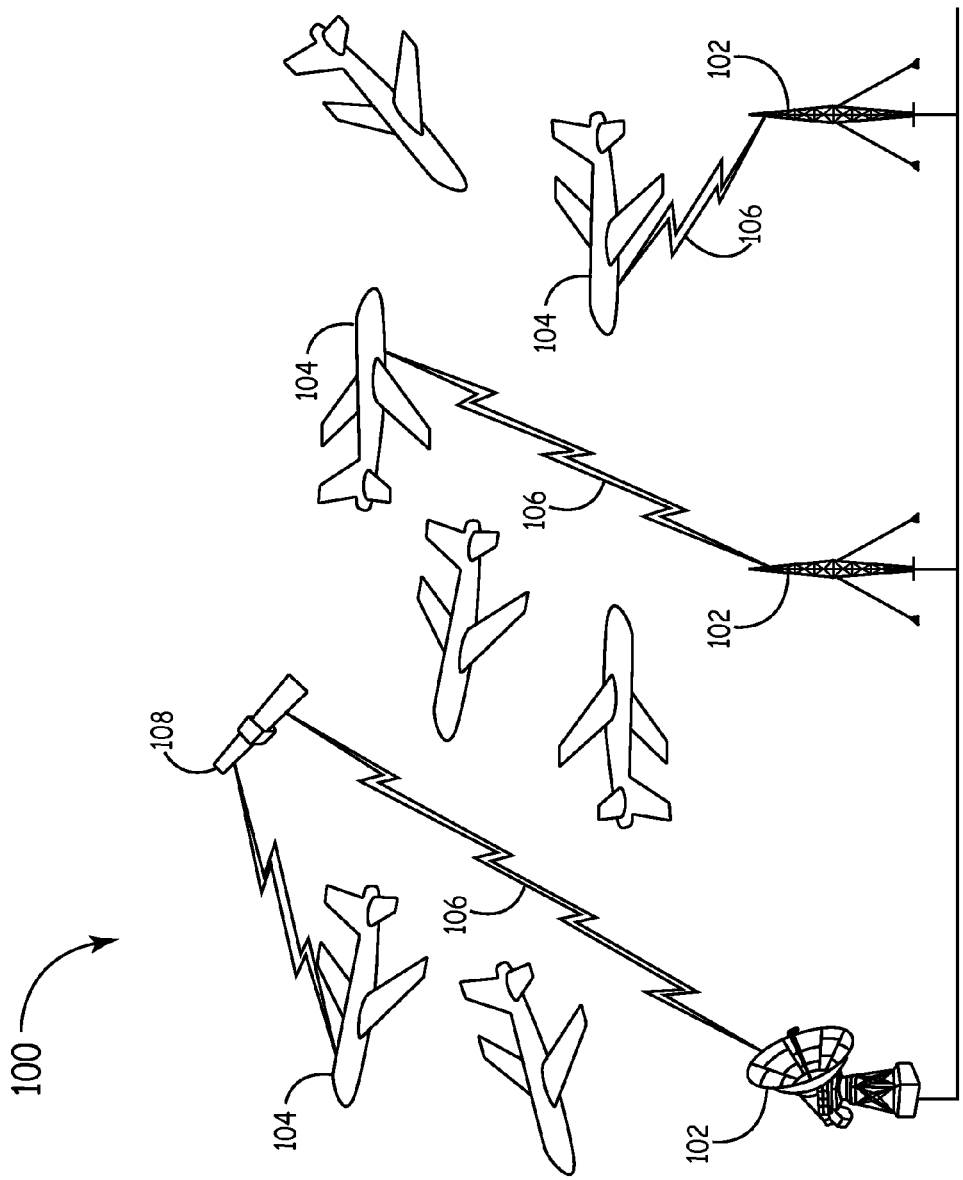
FIG. 1 is a block diagram of an example aeronautical communication system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein relate to remotely tracing software in an avionics device. In some examples, a software trace can be initiated from the ground based on a message sent over an aeronautical datalink. This can enable the software trace to be initiated on-demand while the aircraft which the avionic device corresponds is airborne.

FIG. 1 is a block diagram of an aeronautical communication system 100. The aeronautical communication system 100 includes a plurality of ground stations 102 in bi-directional wireless communication with a plurality of aircraft 104. The aeronautical communication system 100 transports messages between the ground stations 102 and the aircraft 104. In particular, the aeronautical communication system 100 transports messages corresponding to aircraft events (e.g., off the ground, on the ground, into the gate), flight management information (e.g., flight plans, weather information), maintenance data, and other crew or aircraft related information. Example aeronautical communication systems 100 include the Airline Communications, Addressing and Reporting System (ACARS) and the aeronautical telecommunications network (ATN).

The aeronautical communication system 100 can include a plurality of aeronautical datalinks 106 which communicatively couple the aircraft 104 to the ground stations 102. The aeronautical datalinks 106 can be a wireless radio signal connection directly from a ground station 102 to an aircraft 104 or can be routed through a satellite 108 in a SATCOM implementation. Depending on the implementation of the aeronautical communication system (e.g., ACARS, ATN), the aeronautical datalinks 106 can conform to a protocol of ACARS, an ATN protocol, or an Internet Protocol (IP).

As mentioned above, the aeronautical communications system 100 can be used to send messages between the ground stations 102 and the aircraft 104. An uplink message, from a ground station 102 to an aircraft 104, can be sent to one or more avionic devices within an aircraft 104. Moreover, an avionic device within an aircraft 104 can send a downlink message from an aircraft 104 to a ground station 102. Example avionic devices can include a communication management unit (CMU), a communications management function (CMF), an air traffic services unit (ATSU), and an aircraft communications router (ACR). In an example, messages sent from a ground station 102 can be addressed to (e.g., include an identifier for) a specific aircraft 104 when the messages are destined for an avionic device within that aircraft 104.

Figure 2:
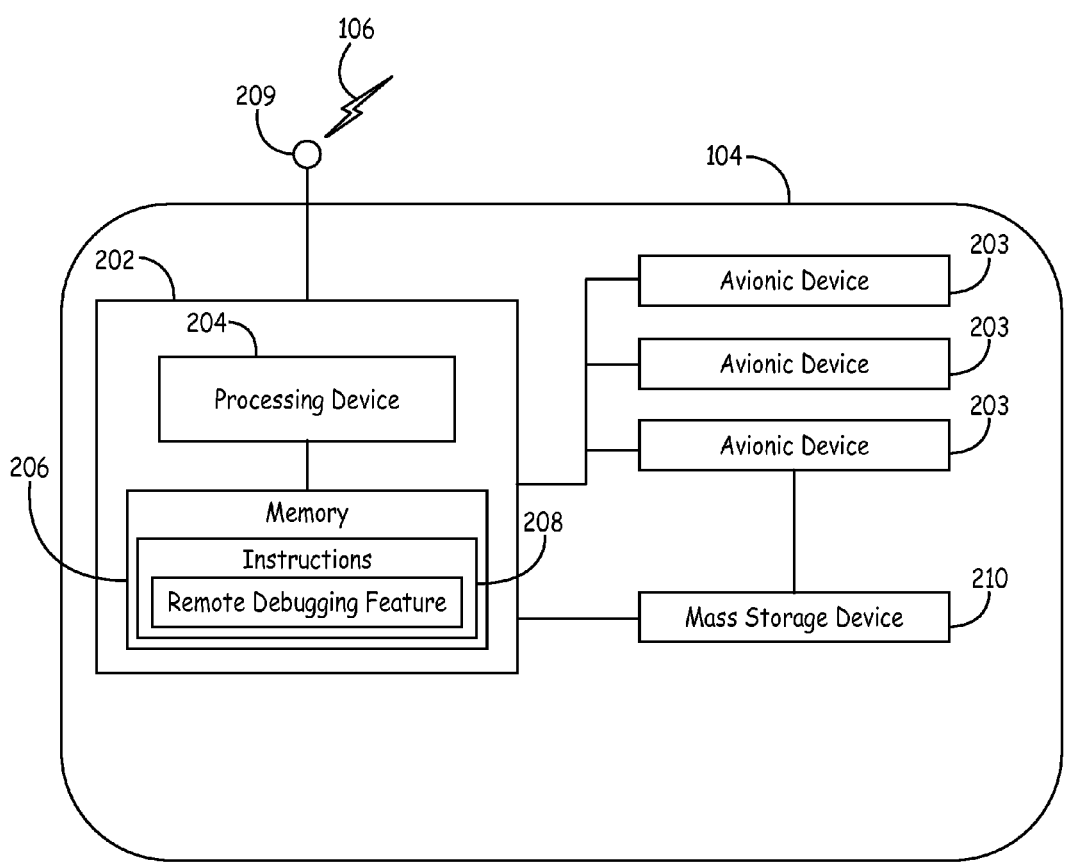
FIG. 2 is a block diagram of an example aircraft in the aeronautical communication system of FIG. 1.

FIG. 2 is a block diagram of an example aircraft 104. The aircraft 104 can include one or more avionic devices 202, 203. A first avionic device 202 can include one or more processing devices 204 coupled to one or more memory devices 206. The one or more memory devices 206 can include instructions 208 thereon for execution by the one or more processing devices 204. The instructions 208, when executed by the one or more processing devices 204, can cause the one or more processing devices 204 to perform certain acts. For example, the avionic device 202 can comprise a CMU and the instructions can cause the one or more processing devices 204 to perform the functions of the CMU. As used herein, the avionic device 202 is "configured" to perform an act when the avionic device 202 includes appropriate elements, hardware, and instructions (e.g., software) for performing the act.

The one or more processing devices 204 can include a central processing unit (CPU), microcontroller, microprocessor (e.g., a digital signal processor (DSP)), field programmable gate array (FPGA), application specific integrated circuit (ASIC), and other processing devices. The one or more memory devices 206 can include any suitable processor-readable medium used for storage of processor-readable instructions and/or data structures. In some examples, the instructions 208 for implementing the acts described herein can be stored on a processor-readable medium separate from the avionic device from which the avionic device is configured to read the instructions 208. Suitable processor-readable media include tangible media such as magnetic or optical media. Tangible media can include a conventional hard disk, compact disk (e.g., read only or re-writable), volatile or nonvolatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc. Suitable processor-readable media can also include transmission media such as electrical, electromagnetic, and digital signals, conveyed via a communication medium such as a network and/or a wireless link.

In example, the avionic device 202 can be configured as a datalink message router (e.g., a CMU, CMF, ATSU, ACR) for the aircraft 104. As a datalink message router, the avionic device 202 can manage message communication over an aeronautical datalink 106 for the aircraft 104. The avionic device 202 can route messages to and from other avionic devices 203 on the aircraft 104 and the aeronautical datalink 106. Uplink messages received by the avionic device 202 over the aeronautical datalink can be routed to the appropriate avionic device 203 and downlink messages from the other avionic devices 202 can be routed over the aeronautical datalink 106. The aircraft 104 can also include one or more antennas 209 to which the avionic device 202 is coupled. The one or more antennas 209 can be configured to sense radio signals received over the aeronautical datalink 106 and radiate radio signals transmitted over the aeronautical datalink 106. The aircraft 104 can include appropriate hardware configure to transmit and receive the radio signal over the aeronautical datalink 106. This hardware can be configured to decode received radio signals to obtain the messages therefrom. The hardware can also be configured to encode message for transmission.

The avionic device 202 can also be configured to operate in a debug mode. When operating in debug mode, the avionic device 202 can provide a plurality of capabilities including performing a software trace. In some examples, in order to provide a software trace the debug mode (e.g., debug utility) of the avionic device 202 is first enabled. Once enabled, the software trace can be initiated and can operate according to certain defined parameters to capture the desired data. In an example, the aircraft 104 can include a mass storage device 210 coupled to the avionic device 202. The mass storage device 210 can also be coupled to other avionic devices 203.

The avionic device 202 can be configured to initiate a software trace in response to a command sent from a ground station 102 over an aeronautical datalink 106. For example, while the aircraft 104 is in flight, a user at a ground station 102 can instruct the ground station 102 to send one or more commands for tracing software to the avionic device 202. The ground station 102 can generate one or more messages including the one or more commands for tracing software, and send the one or more messages over the aeronautical datalink 106 to the avionic device 202. In an example, a plurality (e.g., a sequence) of pre-fabricated commands for implementing one or more particular software traces can be sent by the ground station 102. For example, a manufacturer or other person with knowledge of the software operation of the avionic device 202 can provide a user of the avionic device with one or more sequences of pre-fabricated commands for tracing software. Each sequence of commands can correspond to a particular software trace to be implemented. In order to implement the software trace, the desired software trace can be selected and the ground station 102 can send the sequence of commands corresponding to the selected software trace to the avionic device 202.

The avionic device 202 can interpret the one or more messages to determine whether the one or more messages are addressed to the avionic device 202. If any messages are addressed to the avionic device 202, the avionic device 202 can further interpret the messages to identify any commands therein. In this example, the avionic device 202 can identify the one or more commands for tracing software in the one or more messages. The avionic device 202 can then perform one or more software traces in response to the commands.

The one or more commands for tracing software can include any suitable commands to which the avionic device 202 is configured to respond. For example, the commands can include a software trace enable command, software trace disable command, debug enable command, debug disable command, store trace data command, send downlink trace data command, as well as parameters for the software trace. The parameters can include specific locations, areas, or functions within the software 208 on the avionic device 202 that the software trace should activate. Additionally, parameters can specify one or more pre-defined software traces on the avionic device 202 to initiate. The avionic device 202 can be configured to store data from the software trace to the mass storage device 210 in response to the store trace data command. The avionic device 202 can be configured to send downlink messages containing trace data over the aeronautical datalink 106 to the ground station 102 in response to the send downlink trace data command. Accordingly, the avionic device 202 can be configured to respond to any suitable trace data command and perform the appropriate action in response thereto.

In an example, the avionic device 202 is configured to implement a message interpreter. The message interpreter can interpret uplink messages received over the aeronautical datalink 106 to determine to which avionic device 203 the message is to be routed and/or to determine whether the message includes one or more commands for the avionic device 202. If the message includes one or more commands for the avionic device 202, the avionic device 202 can perform the appropriate action (e.g., provide the command to a debug portion of the software).

In some examples, the avionic device 202 can be configured to authenticate an uplink command by checking for a password. If the password matches an expected password, the avionic device 202 can grant access to the debug features and perform actions corresponding to the command. If the password does not match an expected password, the avionic device 202 can deny access to the debug features and ignore (e.g., discard) the command and send a downlink message indicating failed authentication. In other examples, other authentication procedures can be used, such as encoding of the commands.

As mentioned above, the one or more messages (e.g., uplink software trace commands or downlink trace data) sent over the aeronautical datalink 106 can be formatted according to the protocol of the aeronautical datalink 106. Accordingly, in examples if the aeronautical datalink 106 is part of ACARS, the one or more messages can be formatted to conform to a protocol used by ACARS. If the aeronautical datalink 106 is part of ATN, the one or more messages can be formatted to conform to the ATN protocol. In some examples, the one or more messages can be formatted to conform to the Internet Protocol (IP).

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for remotely initiating a software trace on an avionics device operating on an aircraft, the method comprising:
   at the avionics device, receiving one or more messages sent from a ground station over an aeronautical datalink to the aircraft, wherein the one or more messages conform to a protocol of the aeronautical datalink;
   interpreting the one or more messages to identify any commands for the avionic device therein;
   if the one or more messages include one or more commands for tracing software on the avionic device, tracing the software on the avionic device in response to the one or more commands; and
   sending trace data obtained from tracing the software to a memory device for storage.

2. The method of claim 1, comprising:
   receiving a wireless radio signal sent over the aeronautical datalink and sensed at an antenna on the aircraft, wherein receiving the radio signal includes decoding the radio signal to obtain the one or more messages.

3. The method of claim 2, comprising:
   at a ground station, generating the one or more messages including one or more commands for tracing software on the avionic device, the one or more messages including an identifier indicating that the one or more messages correspond to the aircraft; and
   transmitting the radio signal including the one or more messages over the aeronautical datalink.

4. The method of claim 1, comprising:
   wherein the protocol used by the aeronautical datalink corresponds to one of a protocol for the aircraft communications addressing and reporting system (ACARS), the aeronautical telecommunications network (ATN) protocol, or the internet protocol (IP).

5. The method of claim 1, wherein the avionic device includes one of a communications management unit (CMU), a communication management function (CMF), an air traffic services unit (ATSU), or an aircraft communications router (ACR).

6. The method of claim 1, wherein the one or more commands include a debug enable command and the method comprising:
   operating the avionic device in debug mode in response to the enable debugging command.

7. The method of claim 1, wherein the one or more messages include a password, wherein the method comprises:
   granting access to debug features of the avionic device based on the password.

8. The method of claim 1, wherein the one or more commands include trace parameters and wherein the tracing the software includes tracing the software according to the trace parameters.

9. The method of claim 1, wherein the one or more messages include a command to send the trace data to the ground station over the aeronautical datalink, the method comprising:
   in response to the command to send the trace data to the ground station,
      generating one or more second messages conforming to the protocol of the aeronautical datalink and containing trace data; and
      sending the one or more second messages to the ground station over the aeronautical datalink.

10. An avionic device comprising:
    one or more processing devices;
    one or more memory devices coupled to the one or more processing devices, the one or more memory devices including instructions which, when executed by the one or more processing devices, cause the one or more processing devices to:
      receive one or more messages sent from a ground station over an aeronautical datalink to the aircraft, wherein the one or more messages conform to a protocol of the aeronautical datalink;
      interpret the one or more messages to identify any commands for the avionic device therein;
      if the one or more messages include one or more commands for tracing software on the avionic device, trace the software on the avionic device in response to the one or more commands; and
      send trace data obtained from tracing the software to a memory device for storage.

11. The avionic device of claim 10, wherein the instructions cause the one or more processing devices to:
    receive a radio signal sent over the aeronautical datalink and sensed at an antenna on the aircraft, wherein receive the radio signal includes decode the radio signal to obtain the one or more messages.

12. The avionic device of claim 10, wherein the aeronautical datalink corresponds to one of an aircraft communications addressing and reporting system (ACARS), the aeronautical telecommunications network (ATN) protocol, or the internet protocol (IP).

13. The avionic device of claim 10, wherein the avionic device includes one of a communications management unit (CMU), a communication management function (CMF), an air traffic services unit (ATSU), or an aircraft communications router (ACR).

14. The avionic device of claim 10, wherein the one or more commands include an enable debugging command and wherein in response to the enable debugging command the instructions cause the one or more processing devices to execute instructions corresponding to debug mode of the avionic device.

15. The avionic device of claim 10, wherein the one or more messages include a password, and wherein the instructions cause the one or more processing devices to grant access to debug features of the avionic device based on the password.

16. The avionic device of claim 10, wherein the one or more commands include trace parameters and wherein tracing the software includes tracing the software according to the trace parameters.

17. The avionic device of claim 10, wherein the one or more messages include a command to send the trace data to the ground station over the aeronautical datalink, wherein in response to the command to send the trace data the instructions cause the one or more processing devices to:
    generate one or more second messages conforming to the protocol of the aeronautical datalink and containing trace data; and
    send the one or more second messages to the ground station over the aeronautical datalink.

18. A non-transitory processor-readable medium including instructions which, when executed by one or more processing devices, cause the one or more processing devices to:
    receive one or more messages sent from a ground station over an aeronautical datalink to the aircraft, wherein the one or more messages conform to one of a protocol for the aircraft communications addressing and reporting system (ACARS), the aeronautical telecommunications network (ATN) protocol, or the internet protocol (IP);

interpret the one or more messages to identify any commands for the avionic device therein;
if the one or more messages include one or more commands for tracing software on the avionic device, trace the software on the avionic device in response to the one or more commands; and
store trace data obtained from tracing the software.

19. The processor-readable medium of claim 18, wherein the one or more commands include an enable debugging command and wherein in response to the enable debugging command the instructions cause the one or more processing devices to execute instructions corresponding to a debug mode.

20. The processor-readable medium of claim 18, wherein the one or more commands include trace configuration commands and wherein the tracing the software includes tracing the software according to the trace configuration commands.

* * * * *